(12) United States Patent
Takahashi

(10) Patent No.: US 9,386,182 B2
(45) Date of Patent: Jul. 5, 2016

(54) IMAGE READING APPARATUS AND ASSEMBLING METHOD

(71) Applicant: CANON KABUSHIKI KAISHA, Tokyo (JP)

(72) Inventor: Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/631,538

(22) Filed: Feb. 25, 2015

(65) Prior Publication Data

US 2015/0172500 A1 Jun. 18, 2015

Related U.S. Application Data

(63) Continuation of application No. 13/903,475, filed on May 28, 2013, now Pat. No. 8,995,031.

(30) Foreign Application Priority Data

May 30, 2012 (JP) ................................. 2012-123494

(51) Int. Cl.
| | |
|---|---|
| B23K 31/02 | (2006.01) |
| H04N 1/024 | (2006.01) |
| H04N 1/195 | (2006.01) |
| B23K 1/00 | (2006.01) |
| B32B 37/12 | (2006.01) |
| B32B 37/18 | (2006.01) |
| H04N 1/03 | (2006.01) |

(52) U.S. Cl.
CPC ............ *H04N 1/0249* (2013.01); *B23K 1/0008* (2013.01); *B23K 31/02* (2013.01); *B32B 37/12* (2013.01); *B32B 37/18* (2013.01); *H04N 1/195* (2013.01); *B32B 2457/00* (2013.01); *H04N 1/0303* (2013.01); *H04N 2201/02454* (2013.01); *H04N 2201/02458* (2013.01)

(58) Field of Classification Search
None
See application file for complete search history.

(56) References Cited

U.S. PATENT DOCUMENTS

| 2,042,565 | A | * | 6/1936 | Tillyer | ..................... G02B 7/02 156/64 |
|---|---|---|---|---|---|
| 5,715,099 | A | * | 2/1998 | Takemoto | ................ G02B 7/02 156/293 |
| 6,148,126 | A | * | 11/2000 | Zheng | ...................... G02B 6/32 156/65 |

(Continued)

FOREIGN PATENT DOCUMENTS

| CN | 2609300 Y | 3/2004 |
|---|---|---|
| CN | 1893569 A | 1/2007 |

(Continued)

OTHER PUBLICATIONS

Chinese Masters Theses Full-Text Database Information Science and Technology, Chapter 1, 1.3.1; Chinese Masters Theses-Full-text Database Information Science and Technology, pp. 23-25.

(Continued)

*Primary Examiner* — Kiley Stoner
(74) *Attorney, Agent, or Firm* — Canon U.S.A., Inc., IP Division

(57) ABSTRACT

A document reading apparatus includes a sensor configured to receive light from a document, an imaging lens configured to form an image of light from the document on the sensor, a first holding member to which the imaging lens is fixed, and a second holding member to which the sensor is fixed, wherein the first holding member and the second holding member are fixed using an adhesive and solder.

4 Claims, 10 Drawing Sheets

(56) References Cited

U.S. PATENT DOCUMENTS

| | | | | |
|---|---|---|---|---|
| 8,313,608 B2* | 11/2012 | Garris | G02B 23/12 | 156/291 |
| 8,767,310 B2* | 7/2014 | Ogata | G02B 13/04 | 359/680 |
| 8,792,018 B2* | 7/2014 | Matsuzawa | H04N 5/2254 | 348/239 |
| 8,810,713 B2* | 8/2014 | Matsuo | H04N 5/23212 | 348/345 |
| 8,964,302 B2* | 2/2015 | Kawamura | G02B 15/14 | 359/676 |
| 8,994,842 B2* | 3/2015 | Takahashi | G02B 15/177 | 348/220.1 |
| 8,995,031 B2* | 3/2015 | Takahashi | H04N 1/195 | 358/474 |
| 2003/0173508 A1* | 9/2003 | Tanaka | G02B 26/124 | 250/234 |
| 2003/0196752 A1* | 10/2003 | Freund | G02B 6/4232 | 156/330 |
| 2004/0016982 A1* | 1/2004 | Nakajima | H01L 24/83 | 257/433 |
| 2009/0174947 A1* | 7/2009 | Hasegawa | B32B 38/04 | 359/642 |
| 2009/0190878 A1* | 7/2009 | Yanagisawa | G02B 6/4214 | 385/14 |
| 2009/0310233 A1* | 12/2009 | Ikawa | G11B 7/0932 | 359/811 |
| 2009/0310907 A1* | 12/2009 | Ikeda | G02B 6/43 | 385/14 |
| 2010/0038017 A1* | 2/2010 | Egawa | G02B 7/025 | 156/145 |
| 2010/0091148 A1* | 4/2010 | Verkuijlen | H04N 5/2253 | 348/294 |
| 2010/0133419 A1* | 6/2010 | Suetake | H01L 27/14618 | 250/208.1 |
| 2011/0194022 A1* | 8/2011 | Yang | H04N 5/2251 | 348/374 |
| 2012/0057828 A1* | 3/2012 | Mitamura | G02B 6/4206 | 385/78 |
| 2012/0218649 A1* | 8/2012 | Konishi | G02B 7/08 | 359/813 |
| 2012/0307318 A1* | 12/2012 | Suga | H04N 1/02481 | 358/474 |
| 2012/0320341 A1* | 12/2012 | Aikoh | G03B 21/145 | 353/20 |
| 2013/0114153 A1* | 5/2013 | Lu | H04N 5/2257 | 359/819 |
| 2013/0215924 A1* | 8/2013 | Brennan | H01S 3/091 | 372/70 |
| 2013/0222862 A1* | 8/2013 | Sasaki | H04N 1/02855 | 358/474 |
| 2014/0022447 A1* | 1/2014 | Takahashi | G02B 15/14 | 348/360 |
| 2015/0015745 A1* | 1/2015 | Miyajima | G02B 15/16 | 348/240.1 |

FOREIGN PATENT DOCUMENTS

| | | |
|---|---|---|
| CN | 1984222 A | 6/2007 |
| CN | 101373268 A | 2/2009 |
| CN | 102017596 A | 4/2011 |
| CN | 102075656 A | 5/2011 |
| CN | 102209171 A | 10/2011 |
| JP | H04-372270 A | 12/1992 |
| JP | H07-032135 A | 2/1995 |
| JP | H07-264354 A | 10/1995 |
| JP | H07-297993 A | 11/1995 |
| JP | H09-074523 A | 3/1997 |
| JP | 2009-302745 A | 12/2009 |

OTHER PUBLICATIONS

Handbook on Welding; China Machine Press, 25 Pages.

* cited by examiner

FIG. 10
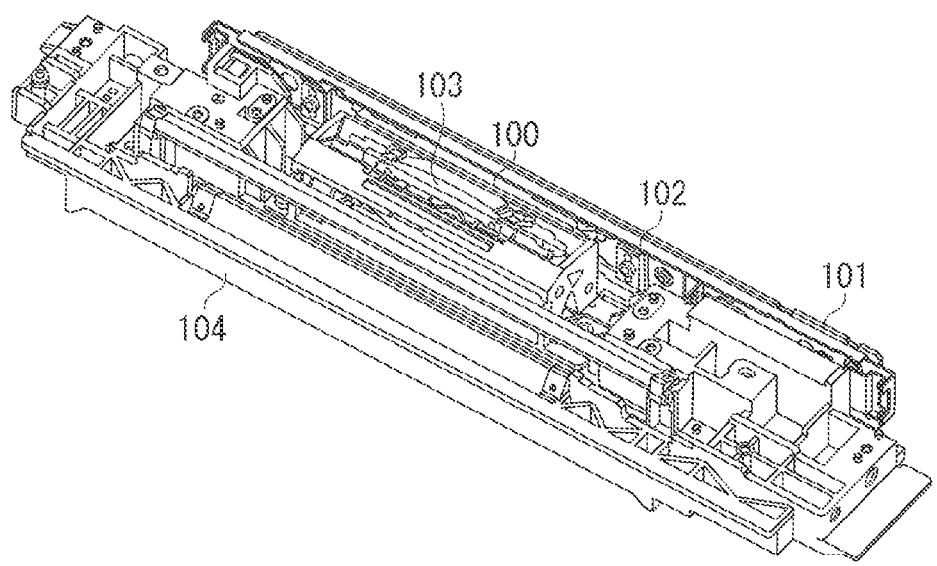
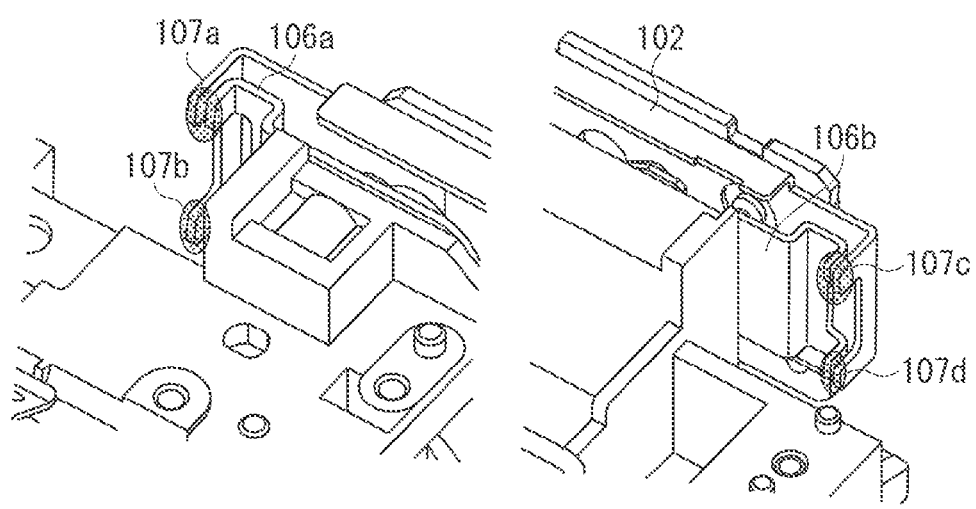

IMAGE READING APPARATUS AND ASSEMBLING METHOD

CROSS REFERENCE TO RELATED APPLICATIONS

The present application is a continuation of U.S. patent application Ser. No. 13/903,475, filed on May 28, 2013, now U.S. Pat. No. 8,995,031, the content of which is expressly incorporated by reference herein in its entirety. This application also claims the benefit of Japanese Patent Application No. 2012-123494 filed May 30, 2012, which are hereby incorporated by reference herein in their entirety.

BACKGROUND OF THE INVENTION

1. Field of the Invention

The present invention relates to an image reading apparatus including an imaging unit that forms an image of light from a document, and a image sensor that receives the light from the document via the imaging unit, and a method for assembling the image reading apparatus.

2. Description of the Related Art

Conventionally, there is an image reading apparatus including an optical unit as illustrated in FIG. 10. The optical unit uses an imaging unit to form an image of light from the document on a solid-state image sensor, and thus generates image data of the document.

In general, when the image reading apparatus is assembled, optical adjustment is performed as follows.

Referring to FIG. 10, a solid-state image sensor 100 is mounted on a solid-state image sensor substrate 101. The solid-state image sensor substrate 101, on which the solid-state image sensor 100 has been mounted, is fixed to a substrate holding member 102. An imaging unit 103 is fixed to an optical unit frame 104. After the optical adjustment is performed, the substrate holding member 102 is fixed to solid-state imaging unit holding members 106a and 106b, which are fixed to the optical unit frame 104. The position of the solid-state image sensor 100 with respect to the imaging unit 103 is adjusted in performing the optical adjustment.

More specifically, the substrate holding member 102 is temporarily held by an adjustment tool (not illustrated). A gap of approximately 1 mm is then formed between the substrate holding member 102 temporarily held by the adjustment tool and the solid-state imaging unit holding members 106a and 106b. The adjustment tool is then used to move the substrate holding member 102, to which the solid-state image sensor 100 is fixed via the solid-state image sensor substrate 101. The position of the solid-state image sensor 100 in X, Y, and θ directions is thus adjusted to adjust the focus on the solid-state image sensor 100.

Adhesives are then injected to and fixated in the gap between the substrate holding member 102 and the solid-state imaging unit holding members 106a and 106b at fixed portions 107a, 107b, 107c, and 107d in the adjusted position. As a result, the substrate holding member 102 is fixed to the optical unit frame 104. In other words, the solid-state image sensor 100 and the imaging unit 103 are fixed to the optical frame unit in a focus-adjusted state. Adhesives, such as a naturally curable adhesive, an ultraviolet curable adhesive, and an instant adhesive, are used.

In recent years, the adhesive is automatically applied, and efficiency is thus improved. However, since the adhesive is made of a material such as acrylic resin and epoxy resin, there is a lack of strength.

Further, solder may be used as a fixing member instead of the adhesive. The fixing strength of the solder is sufficient. However, soldering needs a skilled worker. For example, if a soldering iron is pressed on the substrate holding member 102 while soldering, the position of the substrate holding member, which is only temporarily fixed by the adjustment tool, becomes displaced. Fixing using the solder is thus inefficient.

Furthermore, when the adhesive hardens, volume contraction occurs, so that a relative distance between the solid-state image sensor 100 and the imaging unit 103 is changed. As a result, focus variation occurs before and after curing, and image degradation is generated. In recent years, an increase in the pixel number of the solid-state image sensor has made the solid state image sensor sensitive to changes in the focusing. As a result, the defocusing amount caused by the change in the volume when the adhesive hardens is not ignorable.

SUMMARY OF THE INVENTION

According to an aspect of the present invention, a document reading apparatus includes a sensor configured to receive light from a document, an imaging lens configured to form an image of light from the document on the sensor, a first holding member to which the imaging lens is fixed, and a second holding member to which the sensor is fixed, wherein the first holding member and the second holding member are fixed using an adhesive and solder.

Further features of the present invention will become apparent from the following description of exemplary embodiments with reference to the attached drawings.

BRIEF DESCRIPTION OF THE DRAWINGS

FIG. 10 is a perspective view illustrating a conventional optical unit.

DESCRIPTION OF THE EMBODIMENTS

Exemplary embodiment of the invention will be described in detail below with reference to the drawings.

Figure 1:
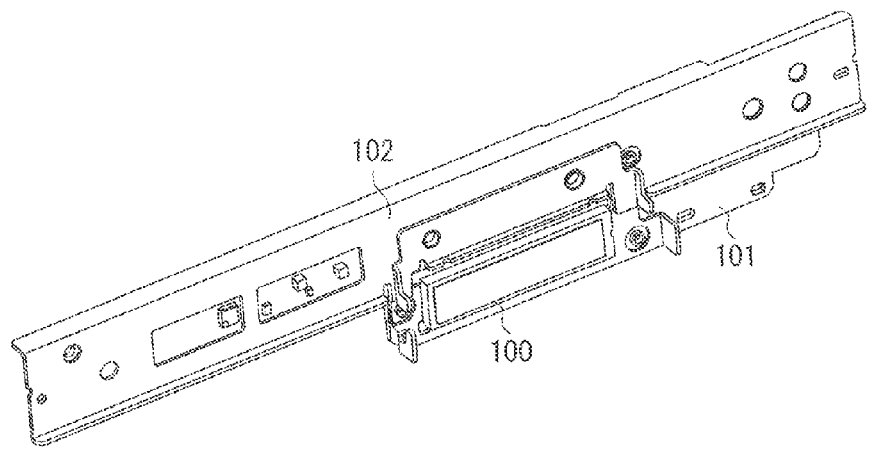
FIG. 1 is a perspective view illustrating a substrate holding member.
Figure 2:
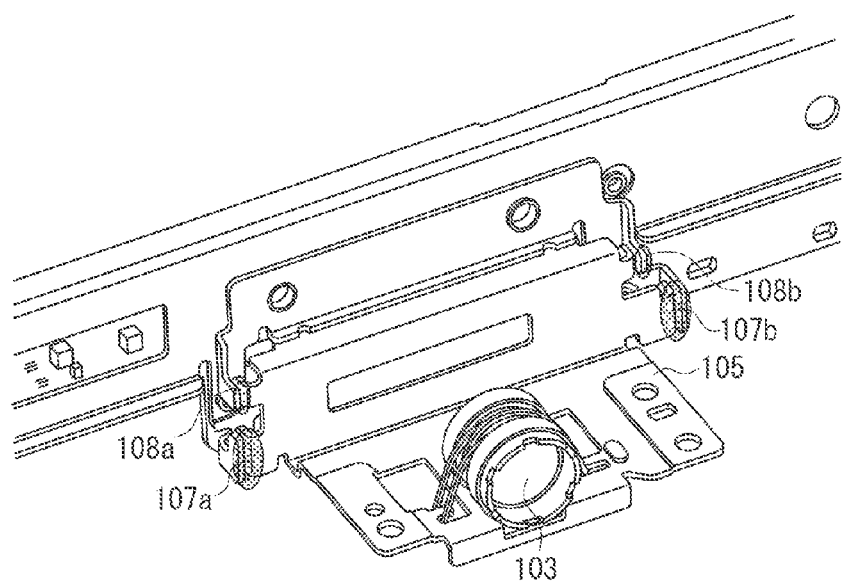
FIG. 2 is a perspective view illustrating an imaging lens holding member.
Figure 3:
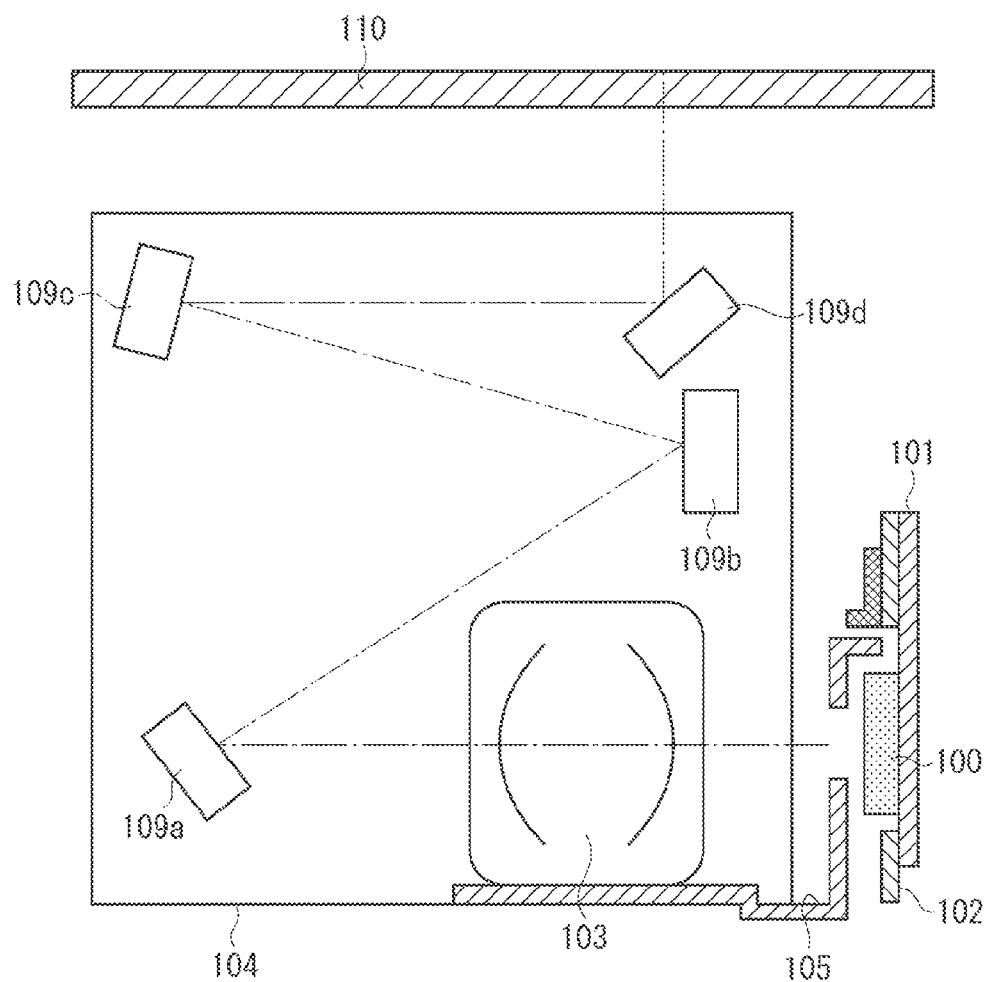
FIG. 3 is a cross-sectional view illustrating an optical unit.
Figure 4:
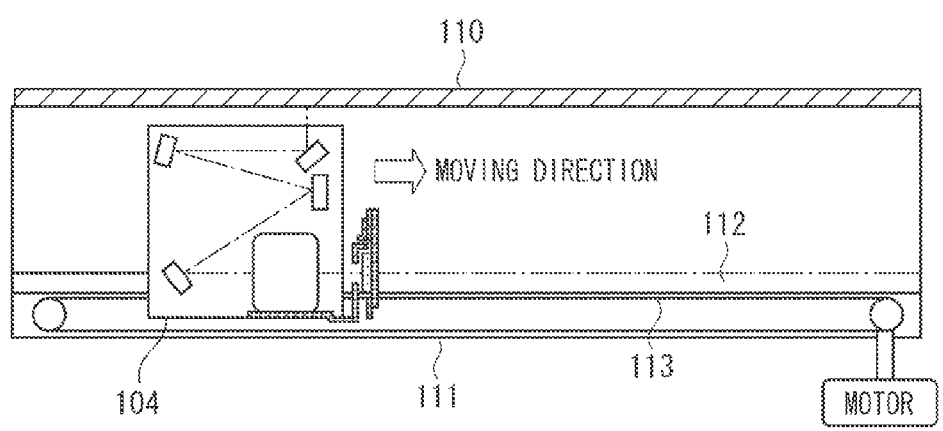
FIG. 4 is a cross-sectional view illustrating an image reading apparatus.

FIG. 4 is a cross-sectional view illustrating an image reading apparatus according to a first exemplary embodiment of the present invention. FIG. 3 is a cross-sectional view illustrating an optical unit in the image reading apparatus. FIG. 1 is a perspective view illustrating a substrate holding member in the optical unit. FIG. 2 is a perspective view illustrating an imaging lens holding member in the optical unit.

Referring to FIG. 4, the image reading apparatus reads a document positioned on a document positioning glass plate 110 by moving the optical unit in a moving direction. The optical unit is stored in a reader frame 111, and a timing belt 113 driven by a motor moves the optical unit along a guide shaft 112 in the moving direction indicated by an arrow illustrated in FIG. 4.

Referring to FIG. 3, the optical unit includes an optical unit frame 104, the imaging lens 103, plane mirrors 109a, 109b, 109c, and 109d, and a solid-state image sensor 100. The plane mirrors 109a, 109b, 109c, and 109d guide to the imaging lens 103 the light, which is irradiated by an illumination unit (not illustrated) and reflected on the document. The imaging lens 103 thus forms an image on the solid-state image sensor 100. The solid-state image sensor 100 then generates an image signal, i.e., an electrical signal, based on the received reflected light. According to the present exemplary embodiment, a complementary metal-oxide semiconductor (CMOS) sensor is used as the solid-state image sensor which receives the reflected light from the document and generates the image signal. A charge-coupled device (CCD) sensor may also be used as the solid-state image sensor.

Referring to FIG. 1, the solid-state image sensor substrate 101, on which the solid-state image sensor 100 is mounted, is fixed to the substrate holding member 102. According to the present exemplary embodiment, the solid-state image sensor substrate 101 is fixed to the substrate holding member 102 by a screw. On the other hand, referring to FIG. 2, the imaging lens 103 including the lens is fixed to the imaging lens holding member 105. Further, the substrate holding member 102 is fixed to the imaging lens holding member 105, and the imaging lens holding member 105 is fixed to the optical unit frame. The substrate holding member 102 and the imaging lens holding member 105 are formed by bending a tinned steel plate.

When assembling, an assembling worker adjusts a positional relation between the imaging lens holding member 105 and the substrate holding member 102 so that the focus becomes adjusted. After performing the adjustment, the assembling worker fixes the substrate holding member 102 to the imaging lens holding member 105 using the adhesive and the solder. The assembling worker then fixes to the optical unit frame 104 the imaging lens holding member 105 fixed to the substrate holding member 102.

The optical adjustment performed in assembling the optical unit will be described below.

In the optical adjustment, the position of the solid-state image sensor 100 with respect to the imaging lens 103 is adjusted. A gap of approximately 1 mm is formed in respective vertical and horizontal focus moving directions in a connecting portion between the imaging lens holding member 105 and the substrate holding member 102, to allow adjustment. According to the present exemplary embodiment, an adjustment tool illustrated in FIG. 5 is used to adjust the position of the substrate holding member 102, to which the solid-state image sensor 100 is fixed, with respect to the imaging lens holding member 105 to which the imaging lens 103 is attached.

Figure 5:
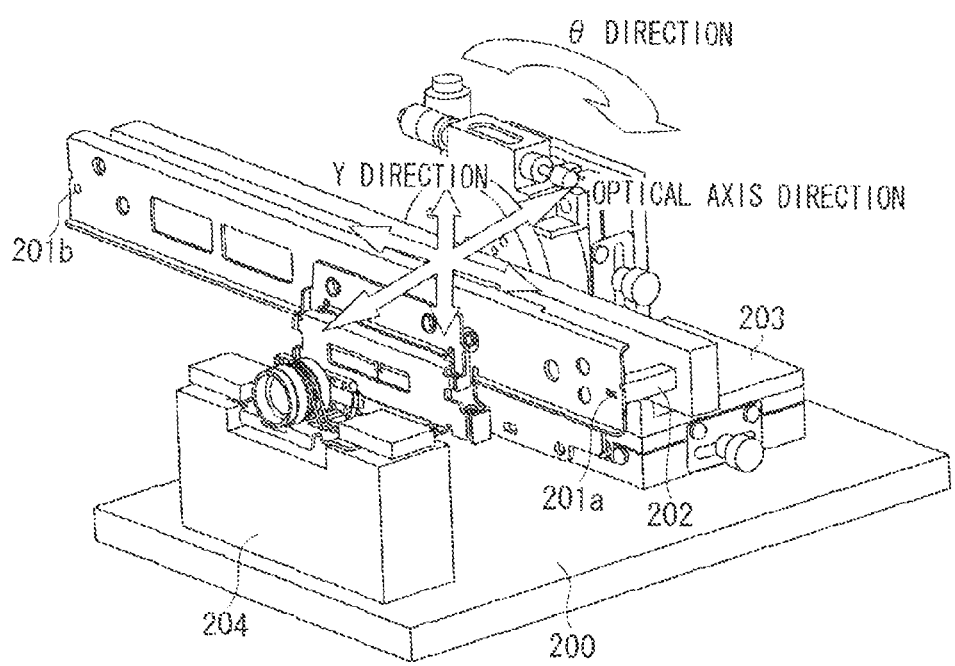
FIG. 5 is a perspective view illustrating an adjustment tool.

Referring to FIG. 5, an adjustment tool 200 includes a pedestal 204, to which the imaging lens holding member 105 is temporarily fixed, and a stage 203, to which the substrate holding member 102 is temporarily fixed.

More specifically, the substrate holding member 102 is temporarily fixed using left and right guide pins 201a and 201b to a clamp device 202 attached to the stage 203. According to the present exemplary embodiment, the solid-state image sensor substrate 101, on which the solid-state image sensor 100 is mounted, is fixed to the substrate holding member 102.

The stage 203 adjusts the position of the substrate holding member 102 in the X, Y, and θ directions. By adjusting the position of the substrate holding member 102 in the X, Y, and θ directions using the stage 203, the position of the solid-state image sensor 100 with respect to the imaging lens 103 can be adjusted so that the focus becomes adjusted.

The method for fixing to the imaging lens holding member 105 the substrate holding member 102, on which optical adjustment has been performed, will be described below.

An automatic injector device (not illustrated) injects the adhesive to gaps as fixed portions 107a and 107b between the substrate holding member 102, on which optical adjustment has been performed, and the imaging lens holding member 105 that are temporarily fixed to the adjustment tool 200. After the adhesive has naturally hardened and reached practical strength, the worker fixes to the imaging lens holding member 105 the substrate holding member 102 using the solder at positions 108a and 108b, which are different from the positions in which the adhesive has been injected. The positions 108a and 108b bound using the solder are near positions, as the fixed portions 107a and 107b, bound by the adhesive, respectively, and are within a range in which the heat due to soldering is transferred.

When the solder cools down and is solidified, the binding strength reaches the same level as the binding strength of metal welding. The substrate holding member 102 and the imaging lens holding member 105 are thus directly and firmly bonded together without other members. As a result, breakage or displacement of the fixed portions due to vibration or impact can be prevented.

When soldering is performed, the substrate holding member 102 and the imaging lens holding member 105 are previously fixed to each other by the adhesive. Thus, the displacement does not occur even if the soldering iron touches the substrate holding member. In other words, the soldering efficiency is improved as compared to the conventional case where the substrate holding member 102 and the imaging lens holding member 105 are fixed using only the solder. Further, since displacement rarely occurs in the soldering, it is not necessary to firmly perform the temporary fixation of the substrate holding member. As a result, the clamp device, such as a magnet clamp which is easily attachable and detachable, may be used, so that efficiency can be further improved.

Figure 6:
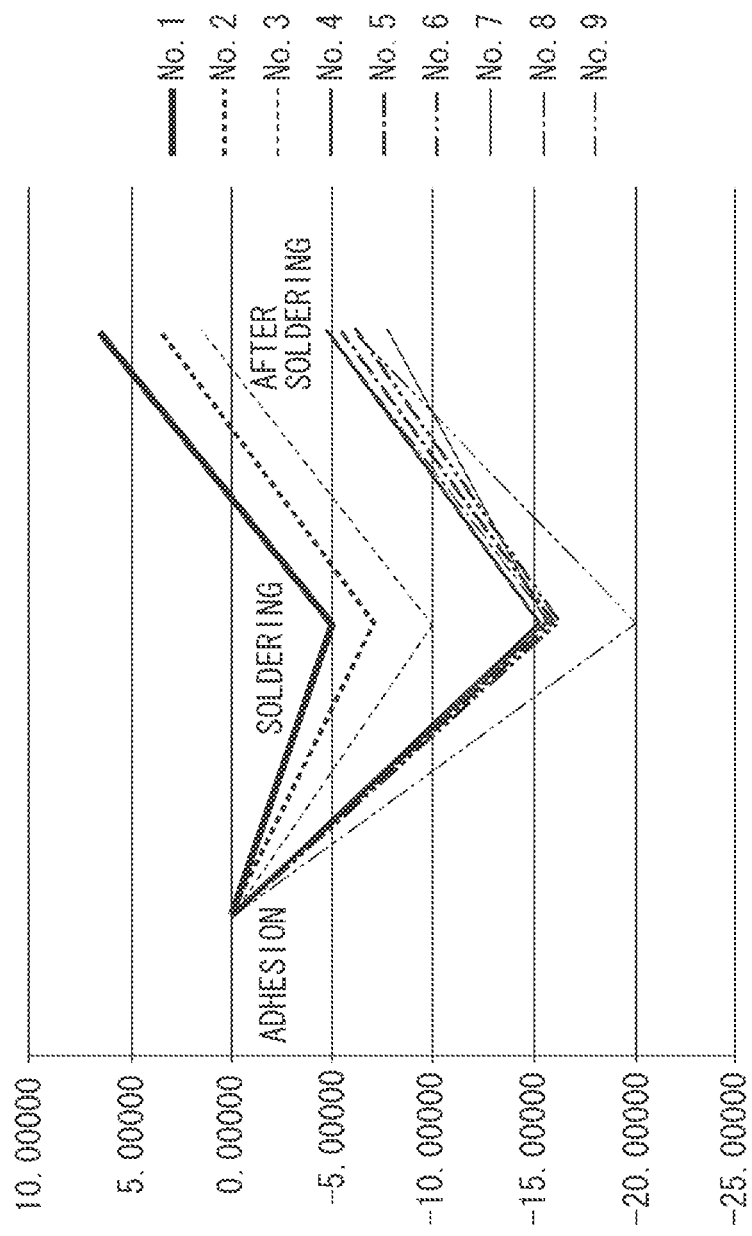
FIG. 6 is a graph illustrating a focus displacement amount.

Furthermore, it is confirmed that a change in focusing before and after the adhesive has hardened can be reduced by setting a soldering bonding position near an adhesive bonding position. FIG. 6 illustrates amounts of focusing position displacement when the substrate holding member 102 and the imaging lens holding member 105 are fixed to each other using the adhesive and then by soldering, after the optical adjustment is performed. Referring to FIG. 6, a vertical axis indicates an amount (μm) of displacement of the focusing position when the focusing position before the adhesion (that is, after performing the optical adjustment) is set to zero. "Adhesion" indicated on a horizontal axis is timing at which the fixation is performed using the adhesive while the focus position has been adjusted by the optical adjustment. "Soldering" indicates timing at which soldering is performed after the adhesive has fixated. "After soldering" indicates timing at which the solder has fixated. Lines No. 1, No. 2, No. 3, No. 4, No. 5, No. 6, No. 7, No. 8, and No. 9 each indicate results of the experiment. As illustrated in FIG. 6, the focusing position, which has been displaced due to volume contraction caused by fixation of the adhesive, can be returned towards the zero position direction by performing soldering. Further, according to the present exemplary embodiment, the focusing position displacement becomes less than or equal to ±10 μm, which is an appropriate range thereof, in all of the nine experiment results. As described above, the effect of volume contraction due to the hardening of the adhesive can be reduced by arranging the fixed portion using the solder near the fixed portion using the adhesive. It is assumed that such a phenomenon occurs as follows. The heat caused by the soldering is transferred to the fixated adhesive, and the hardened adhesive expands. An anneal effect then occurs on the hardened adhesive, and an internal distortion (residual stress) of the hardened adhesive is released, so that the focusing position, which has been displaced due to the effect of the volume contraction, returns towards the zero position direction.

Further, the solder-fixed portion acts as a ground between the substrate holding member 102 and the imaging lens holding member 105, and may thus hold a margin with respect to static and electromagnetic interference (EMI) radiation noise.

The ultraviolet curable adhesive may be used as the adhesive. The ultraviolet curable adhesive hardens in a short time by being irradiated with the ultraviolet light, so that work time can be shortened. Further, an instant curable adhesive may be used as the adhesive. If there is a gap which cannot be reached by the ultraviolet light, or a portion which cannot be reached by the ultraviolet light due to a shadow of a shape, the substrate holding member 102 and the imaging lens holding member 105 may be fixated in a shorter time by using the instant curable adhesive instead of the ultraviolet curable adhesive.

Further, the positions and the number of the adhesive-fixed portions and the solder-fixed portions are not limited to the positions and the number illustrated in FIG. 2.

Figure 7:
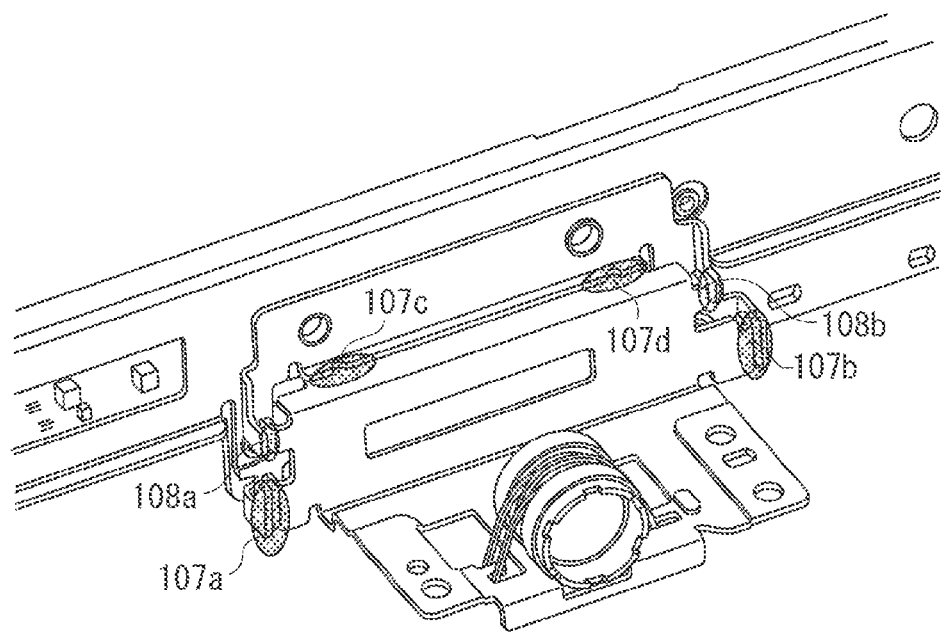
FIG. 7 illustrates a modification example of a portion fixed using an adhesive and solder.

For example, as illustrated in FIG. 7, there may be four adhesive-fixed portions (107a, 107b, 107c, and 107d) and two solder-fixed portions (108a and 108b). Referring to FIG. 7, the solder-fixed portions are arranged to be approximately equidistant from the plurality of positions bound using the adhesive. In other words, the position of the solder-fixed portion 108a is approximately equidistant from the adhesive-fixed portions 107a and 107b, and the position of the solder-fixed portion 108b is approximately equidistant from the adhesive-fixed portions 107c and 107d. By such an arrangement, the heat caused by performing the soldering is equally transferred to the respective adhesives, so that the anneal effect on each adhesive makes the contraction amount due to the hardening uniform, and thus the change in focusing is further reduced.

Figure 8:
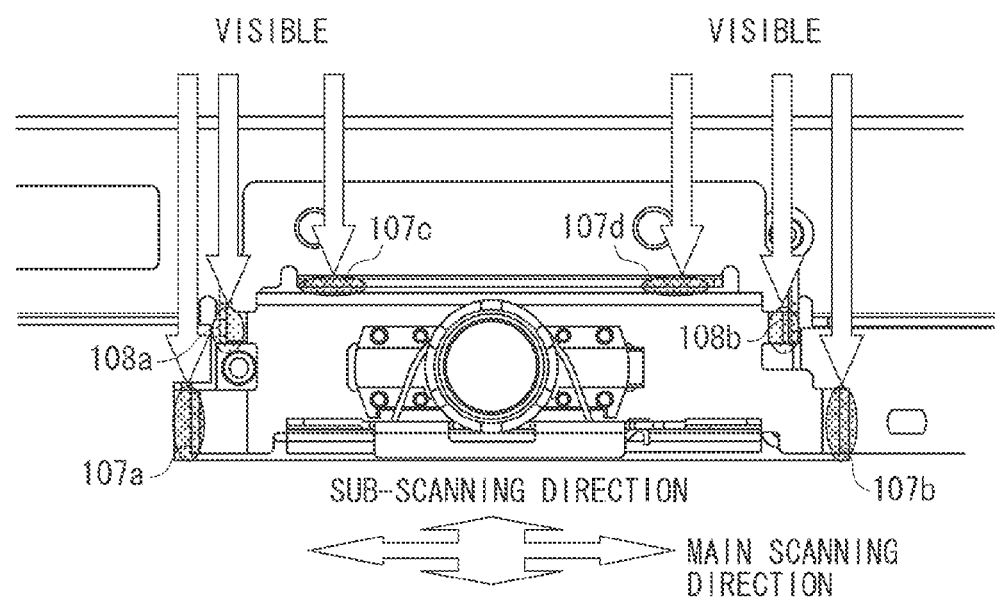
FIG. 8 illustrates the modification example of the portion fixed using the adhesive and the solder.

Furthermore, as illustrated in FIG. 8, the worker can view from the imaging lens side of the adjustment tool the positions of the adhesive-fixed portions 107a, 107b, 107c, and 107d and the solder-fixed portions 108a and 108b. When performing the optical adjustment, the worker performs the adjustment while viewing from the imaging lens side. If the adhesive-fixed portions and the solder-fixed portions are arranged not to mutually become blind spots when the worker views the adjustment tool from the imaging lens side, the efficiency can be improved and failure to perform bonding may be prevented.

Figure 9:
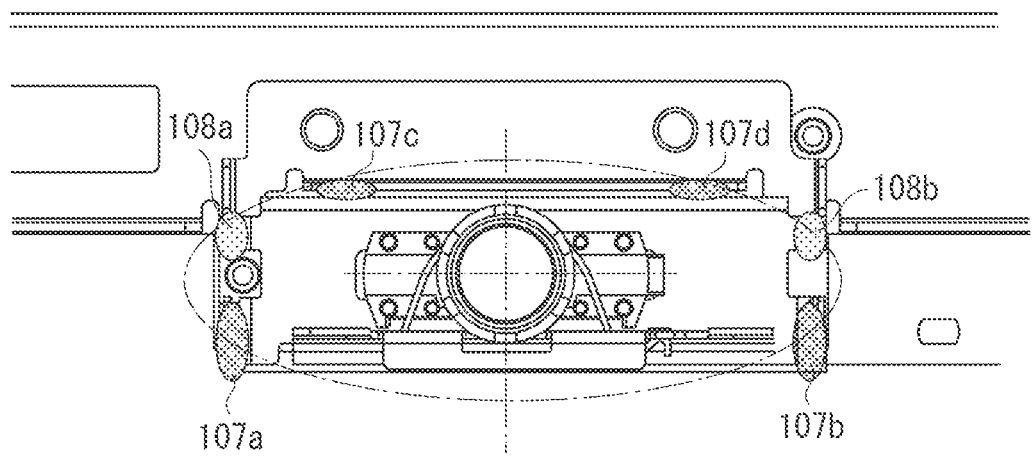
FIG. 9 illustrates the modification example of the portion fixed using the adhesive and the solder.

Moreover, as illustrated in FIG. 9, the positions of the adhesive-fixed portions 107a, 107b, 107c, and 107d and the solder-fixed portions 108a and 108b are arranged approximately on an ellipse centered on an optical axis of the lens in the imaging lens 103. According to the above-described exemplary embodiment, the amount of displacement of the focus position due to the volume contraction when the adhesive hardens can be reduced. However, the amount of displacement cannot be reduced to zero. To solve such a problem, if the positions of the adhesive-fixed portions and the solder-fixed portions are arranged as illustrated in FIG. 9, the following may be achieved. The amount of displacement due to contraction, which cannot be reduced according to the above-described exemplary embodiment, becomes uniform in a main scanning direction or a sub-scanning direction with respect to the imaging lens. In other words, a failure such as a one-sided blur can be prevented. The positions of the adhesive-fixed portions and the solder-fixed portions do not have to be arranged approximately on an ellipse, but may be arranged approximately on a circle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for assembling an optical unit provided to a document reading apparatus for reading a document, the method comprising:
    adjusting a positional relation between a first holding member to which an imaging lens is fixed and a second holding member to which a sensor substrate mounted with a sensor is fixed, so as to adjust a focus;
    fixing the first holding member and the second holding member of which the positional relation are adjusted by using an adhesive; and
    soldering the first holding member and the second holding member which are fixed using the adhesive,
    wherein the first and second holding members are steel plates treated with coating processing.

2. The method for assembling according to claim 1, wherein, in the adjusting, a position of the second holding member with respect to the first holding member is moved toward X and Y directions which are perpendicular to an optical axis direction, and is rotated with respect to the optical axis direction.

3. The method for assembling according to claim 1, wherein the adhesive is ultraviolet curing-type adhesive.

4. The method for assembling according to claim 1, wherein the position to be fixed with the adhesive and the position to be soldered are different.

* * * * *